Figure 1:
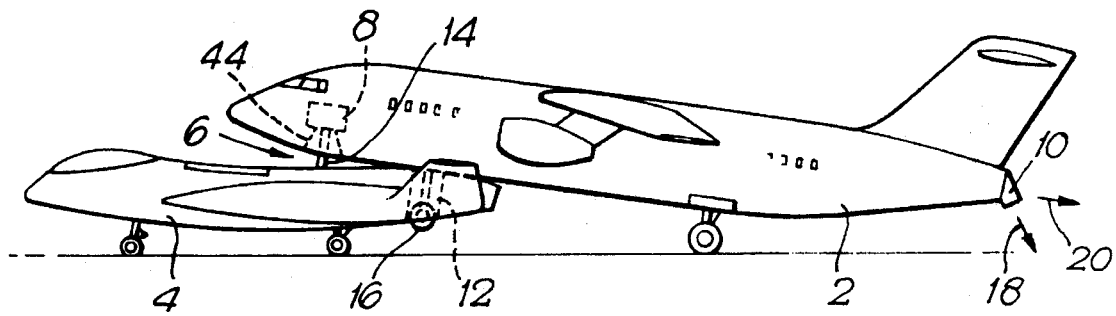

United States Patent [19]

Milner

[11] Patent Number: 5,465,923
[45] Date of Patent: Nov. 14, 1995

[54] VERTICAL TAKE-OFF/LANDING OF AIRCRAFT

[75] Inventor: Paul Milner, Preston, Great Britain

[73] Assignee: British Aerospace PLC, London, England

[21] Appl. No.: 95,438

[22] Filed: Jul. 23, 1993

[30] Foreign Application Priority Data

Jul. 25, 1992 [GB] United Kingdom ............... 9215846

[51] Int. Cl.⁶ ........................ B64C 37/02; B64D 5/00
[52] U.S. Cl. ................... 244/2; 244/131; 244/137.4
[58] Field of Search ............................. 244/2, 63, 131, 244/137.4

[56] References Cited

U.S. PATENT DOCUMENTS

| | | |
|---|---|---|
| 2,921,756 | 1/1960 | Borden . |
| 3,419,234 | 12/1968 | Poirer ........................... 244/2 |
| 3,516,624 | 6/1970 | Crook ........................... 244/2 |
| 3,568,953 | 3/1971 | Beezley ......................... 294/2 |
| 4,265,416 | 5/1981 | Jackson . |
| 4,267,987 | 5/1981 | McDonnell . |
| 4,678,141 | 7/1987 | Sarrantonio . |
| 5,000,398 | 3/1991 | Rashev . |
| 5,143,327 | 9/1992 | Martin ..................... 244/158 R |

FOREIGN PATENT DOCUMENTS

| | | |
|---|---|---|
| 264030 | 4/1988 | European Pat. Off. ............ 244/2 |
| 0304590 | 1/1989 | European Pat. Off. . |
| 0882073 | 11/1961 | United Kingdom . |
| 0926613 | 5/1963 | United Kingdom . |
| 952333 | 3/1964 | United Kingdom . |
| 2187155 | 9/1987 | United Kingdom . |

Primary Examiner—Andres Kashnikow
Assistant Examiner—Virna Lissi Mojica
Attorney, Agent, or Firm—Cushman, Darby & Cushman

[57] ABSTRACT

This invention relates to a composite aircraft comprising a conventional aircraft (2) and a carrier aircraft (4) connected together during flight as a composite aircraft by way of a connector (6). The carrier aircraft has a vertical takeoff and/or landing capability and the conventional aircraft is provided with a directable propulsion nozzle so that during operations as a composite aircraft lift is shared by components of lift from the propulsion systems of both aircraft. Therefore, by connecting itself to the carrier aircraft, the conventional aircraft may takeoff and/or land vertically as the case may be, but without the requirement for a vertical takeoff and/or landing capability of its own and all the weight penalties associated therewith. Once the desired vertical takeoff manoeuvre has been completed by the composite aircraft the two aircraft may then be disconnected and the conventional aircraft may then continue its flight, while the carrier aircraft 4 may return to base and then carry out another vertical takeoff for another conventional aircraft, or it may, in an in-flight refuelling like operation, mate with a conventional aircraft, and land vertically as a composite aircraft.

5 Claims, 2 Drawing Sheets

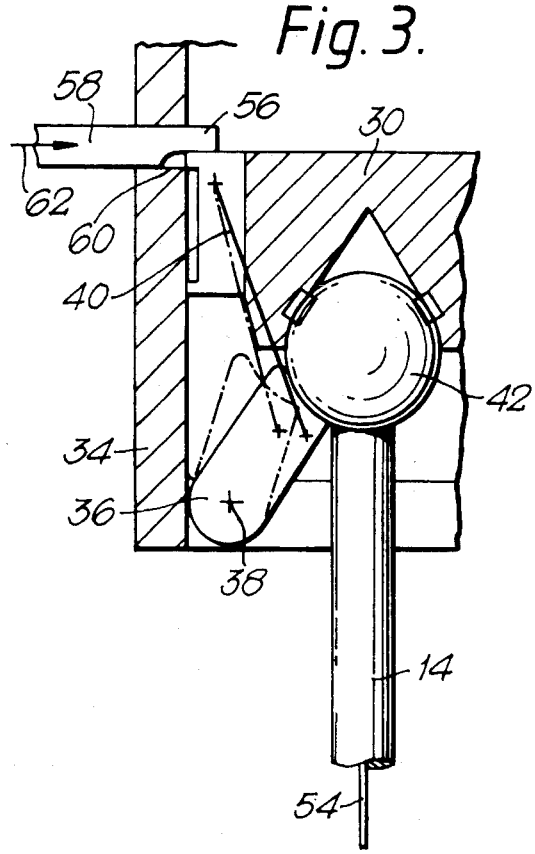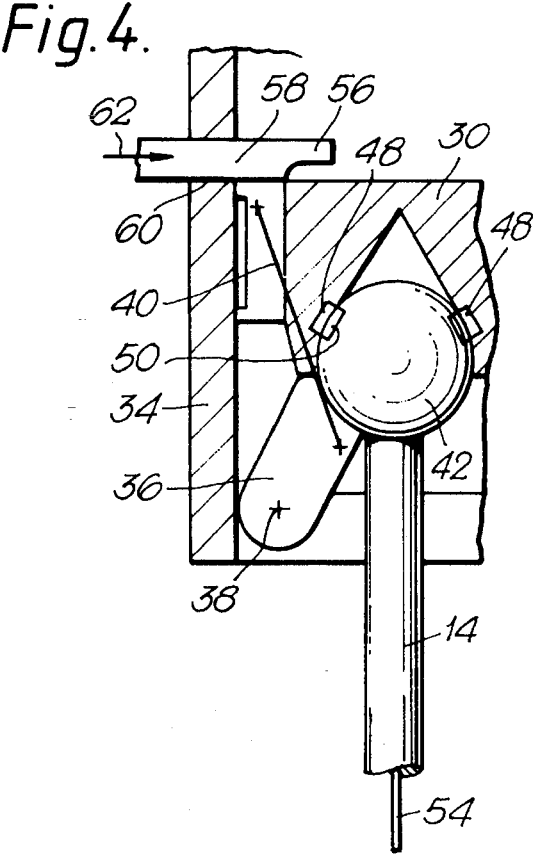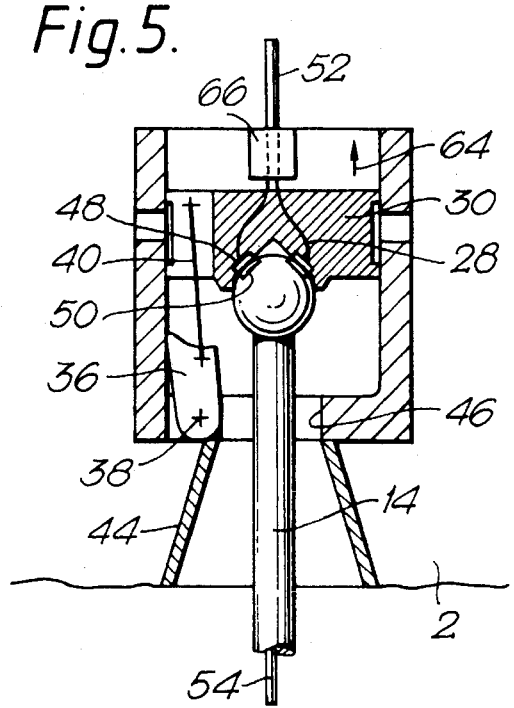

VERTICAL TAKE-OFF/LANDING OF AIRCRAFT

This invention relates to the connecting together of two aircraft, one of which is of the vertical takeoff/landing variety - thereby allowing the other aircraft to takeoff and/or land vertically by virtue of the characteristics of the aircraft to which it is connected.

Although it is well known that vertical take-off and landing capabilities for aircraft are highly desirable (because, for example, it allows taking-off and landing without requiring a runway), it is also appreciated that such a capability cannot be provided without having adverse affects on performance relative to conventional aircraft. The penalties include increased mass due to the complexity of the propulsion systems, and thus reduced range for a given fuel capacity, and greater complexity and cost.

U.S. Pat. No. 5,000,398 (Rashev) discloses a flying multi-purpose aircraft carrier having a vertical/short take-off and landing (V/STOL) capability. The carrier, or tug aircraft, is intended to enable conventional aircraft to take-off and land without requiring a conventional runway, and comprises a small runway section of its own—on two opposite sides of which are positioned a set of rotary wings for enabling it to fly. The runway section includes down-lock mechanisms which lock the conventional aircraft's wheels thereto during composite flight. To launch the conventional aircraft from the carrier in flight the composite aircraft is headed into wind at a speed slightly greater than the stalling speed of the conventional aircraft, the engines of the conventional aircraft are accelerated to take-off rpm and the down-lock mechanism is released.

Other known proposals of this type, (see for example: GB patents 2,187,155 A (Schroder); 952,333 (English Electric); and 834,731 (Soc Nationale D'Etude Et de Construction de Moteurs D'Aviation); and U.S. Pat. No. 4,678,141 (Sarrantonio) rely on the tug aircraft providing the total initial lifting force required to get both aircraft airborne.

GB patent 882,073 (Rolls-Royce) describes combinations of an operational aircraft and an auxiliary lift aircraft, or tug, which form composite aircraft capable of launching the operational aircraft in flight to give it improved operational range and payload. The operational aircraft may have an engine lift capability but in most of the examples shown the tug provides the majority of the initial lifting force. Moreover, the initial lifting force is applied through the centre of gravity of the operational aircraft in each case.

U.S. Pat. No. 4,267,987 (William R McDonnell) shows a composite aircraft which uses a helicopter as the tug aircraft again providing initial lifting force through the centre of gravity of the conventional aircraft carried aloft by the tug.

An object of the invention is to provide an improved means for allowing a substantially conventional aircraft to takeoff and/or land vertically but without the penalties usually associated with aircraft having such a capability.

It is a further object of the invention to provide a composite aircraft in which initial lifting forces required to lift both the conventional aircraft and the tug aircraft forming the composite to an in-flight situation in which they may separate and be separately sustained in flight are substantially equally shared between them and accordingly the tug aircraft may be smaller than known tug aircraft.

It is yet a further object of the invention to provide such a composite aircraft in which the conventional aircraft comprises a currently available aircraft with substantially few modifications.

According to one aspect of the present invention there is provided a composite aircraft comprising a carrier aircraft having a capability to provide in use a first component of lift and another aircraft provided with propulsive force applying means adapted to provide in use a second component of lift substantially equal in magnitude to said first component, a connector comprising a connecting member for extending from said carrier aircraft to said another aircraft, respective attachment means, at least one of which is releasable, for attaching said carrier aircraft and said connecting member, and control means for controlling the releasable attachment means such that said carrier aircraft and said another aircraft are connected from take-off until a predetermined stage of flight during which period they are lifted and sustained in an airborne state as a composite aircraft by a combination of said first and second components of lift, thereby allowing said another aircraft to take-off substantially vertically, whereafter said another aircraft and said carrier aircraft are disconnected and are each able to continue flight separately.

Thus, the connector and the shared lift facilities allow said another aircraft (which may be substantially conventional) to takeoff vertically, detach itself from the carrier aircraft, and subsequently continue in normal flight without any of the penalties associated with the inclusion of a vertical takeoff capability in the said another aircraft.

According to another aspect of the invention there is provided a composite aircraft comprising a carrier aircraft having a capability to provide in use a first component of lift and another aircraft provided with propulsive force applying means adapted to provide in use a second component of lift substantially equal in magnitude to said first component, a connector comprising a connecting member for extending from said carrier aircraft to said another aircraft, respective attachment means, at least one of which is releasably attached, for attaching said carrier aircraft and said another aircraft to said connecting member, and control means for controlling the releasable attachment means such that said carrier aircraft and said another aircraft are connected from a predetermined stage of flight until landing during which period they are lifted and sustained in an airborne state as a composite aircraft by a combination of said first and said second components of lift, thereby allowing said another aircraft to land substantially vertically.

Thus, said another aircraft may land vertically without requiring its own vertical landing capability.

Advantageously, the connector comprises data transmission means for transmitting data between said carrier aircraft and said another aircraft. This may allow both aircraft, when connected to one another as a composite aircraft, to be controlled from the cockpit of said carrier or said another aircraft.

According to a further aspect of the invention there is provided an aircraft comprising propulsive force applying means for generating a component of lift for said aircraft and including a connector for connecting said aircraft to a carrier aircraft having a vertical take-off capability, said connector comprising a connecting member for extending from said aircraft to said carrier aircraft, respective attachment means, at least one of which is releasable, for attaching said aircraft and said carrier aircraft to said connecting member, and control means for controlling the releasable attachment means such that said carrier aircraft and said aircraft are connected from take-off until a predetermined stage of flight during which period lift for said composite aircraft is provided partly by said propulsion force applying means and partly by said carrier aircraft, thereby allowing said aircraft to take-off vertically, whereafter said aircraft and said carrier aircraft are disconnected and are each able to continue flight separately.

The propulsive force applying means may be directed generally downwardly and rearwardly with respect to the aircraft. Advantageously, the propulsive force applying means is directable, thereby allowing the propulsive force to be applied in a range of directions including generally downwardly to generally rearwardly with respect to the aircraft.

Conveniently, one of the said carrier aircraft, said another aircraft and said connector includes aircraft control data modifying means for receiving aircraft control data from said carrier aircraft and said another aircraft and modifying said control data when said carrier aircraft and said another aircraft are attached to one another, the modification being such that said control data is modified in accordance with a control law which enables the controlled flight of said carrier aircraft and said another aircraft when attached to one another as a composite aircraft.

For a better understanding of the invention, an embodiment of it will now be described by way of a non-limiting example, with reference to the accompanying drawings, in which:

FIG. 1 shows a substantially conventional aircraft attached to a carrier aircraft; and FIG. 2 to 5 are schematic part-sectional views of a connector which connects the two aircraft shown in FIG. 1 together.

To improve understanding of the drawings, like elements which appear in more than one figure are designated by the same reference numeral.

FIG. 1 shows a composite aircraft comprising a substantially conventional aircraft 2 attached to a carrier (or tug) aircraft 4 by way of a connector 6. The substantially conventional aircraft 2 (which will hereinafter be referred to as the conventional aircraft for the sake of brevity) is modified in several ways, including the provision of a releasable attachment means 8 which allows the connection and disconnection of the conventional aircraft 2 to the carrier aircraft 4 to be controlled. The modifications may also include a directable propulsion nozzle 10 of the type found on many conventional short takeoff and landing (STOL) aircraft. The carrier aircraft 4 is of the vertical takeoff and landing (VTOL) type, but is altered to provide a bore 12 through its rear section, and a connecting member 14 extending from its upper surface.

The connector 6 allows the transmission of data between the two aircraft, thereby allowing aircraft control data to be passed between them. Advantageously, both aircraft have a full authority, digital, integrated flight control and propulsion control system (IFPCS), i.e. the aircraft are of the "fly-by-wire" type. When the aircraft are connected to one another, aircraft control data from the IFPCS on each aircraft is transmitted to a modifier unit (not shown) on one or other of the aircraft, or in the connector, instead of being transmitted to the flying control surface operating means and propulsion systems. The purpose of the modifier unit is to enable the two connected aircraft of the composite aircraft to fly successfully together. At the instance of connection and disconnection of the two aircraft, their respective IFPCS systems change mode. The conventional aircraft 2 is driven by signals received from the modifier unit and is no longer controllable by its pilot. The IFPCS of the carrier aircraft 4 adopts a mode, in conjunction with the modifier unit, for flying the two aircraft. In this mode the modifier unit drives the flying control surfaces and propulsion systems in accordance with a control law which enables the two aircraft to fly and change direction when connected to one another.

For vertical take-off the conventional aircraft 2 is attached to the carrier aircraft 4. The nose wheel 16 of the conventional aircraft 2 passes through the bore 12 in the carrier aircraft 4, and the connecting member 4 passes into the releasable attachment means 8 in the conventional aircraft. The attachment means 8 locks the aircraft together and simultaneously switches the respective IFPCS's to the appropriate mode for connected flight. The carrier aircraft pilot controls the vertical takeoff of the two aircraft from the cockpit of the carrier aircraft 4. After vertical take-off and transition to forward flight and when the flight speed exceeds the stalling speed of the conventional aircraft 2, the attachment means 8 releases the connecting member 14, thereby allowing each aircraft to continue its flight separately and automatically switching the respective IFPCS's into the appropriate mode for controlling flight of the aircraft separately. The carrier aircraft 4 may then return to base and is then available for enabling another conventional aircraft to take-off vertically.

During vertical take-off the carrier aircraft's VTOL propulsion system provides a first component of lift and the propulsion nozzle 10 of the conventional aircraft is directed generally downwardly to provide a second component of lift. The first and second components of lift are substantially equal in magnitude and are substantially symmetrically disposed about the centre of gravity of the composite aircraft.

For vertical landing, the conventional aircraft 2 and the carrier aircraft 4 dock in flight in a similar manner to that used in in-flight refuelling. The attachment means 8 in the conventional aircraft 2 then locks the aircraft together as a composite aircraft. As with connection of the aircraft before vertical take-off, the IFPCS systems in each of the aircraft switch to the appropriate mode for combined flight. The pilot of the carrier aircraft 4 then employs the vertical landing capability of the carrier aircraft 4 and the downwardly directed propulsion nozzle 10 of the conventional aircraft to land the conventional aircraft 2 vertically.

The directable propulsion nozzle 10 is directed in the direction shown by arrow 18 by the IFPCS of the carrier aircraft 4 and modifier unit during vertical takeoff and landing. In this way, the conventional aircraft 2 makes a contribution to the lift required for the conventional and carrier aircraft 2 and 4 combination. Once detached from the carrier aircraft 4, the IFPCS of the conventional aircraft 2 then directs the directable propulsion nozzle 10 in the direction of arrow 20 for more efficient forward flight.

Because the carrier aircraft and the conventional aircraft when connected as a composite share lift forces in a ratio needed to balance the composite during vertical take-off or landing operations the carrier aircraft may be relatively small. This in turn would allow operation of the composite from sea going aircraft carrying warships of relatively small size. Moreover the carrier aircraft may thus be a modified VTOL aircraft which may be operated normally between launches and retrievals of conventional aircraft.

The composite aircraft may be parked in a flight-ready configuration, permitting rapid launch of multiple composites without using fuel mounting each conventional aircraft on its carrier aircraft. In any case the mating manoeuvre would require little supporting ground equipment.

It should be appreciated that the IFPCS systems of each of the aircraft need not have a separate mode for combined flight, but only the propulsion systems of the two aircraft need be controlled together, therefore allowing non-fly-by-wire aircraft to take-off and land vertically in accordance with the invention.

Because the carrier aircraft and the conventional aircraft when connected as a composite share lift forces in a ratio needed to balance the composite during vertical take-off or landing operations the carrier aircraft may be relatively small. This in turn would allow operation of the composite from sea going aircraft carrying warships of relatively small size. Moreover the carrier aircraft may thus be a modified VTOL aircraft which may be operated normally between launches and retrievals of conventional aircraft.

The composite aircraft may be parked in a flight-ready configuration, permitting rapid launch of multiple composites without using fuel mounting each conventional aircraft on its carrier aircraft. In any case the mating manoeuvre would require little supporting ground equipment.

It should also be noted that, as an alternative to the pilot of the carrier aircraft 4 having control of the combination when they are connected to one and other the pilot of the conventional aircraft 2 may instead have control.

The connector 6 and attachment means 8 may be of any suitable known design, for example of the type described in our granted UK Patent GB2214158B. The connector described in that granted patent is illustrated in FIGS. 2 to 5. Briefly, the mechanism comprises a piston 30 having a centring recess 32, and lying in the bore of outer casing 34. Three jaws, only one of which 36 can be seen, are positioned around the base of the casing 32 and pivotally attached thereto (at point 38 for the illustrated jaw). The piston 30 is connected to each of the three jaws 36 by way of respective spring housings 40.

Figure 2:
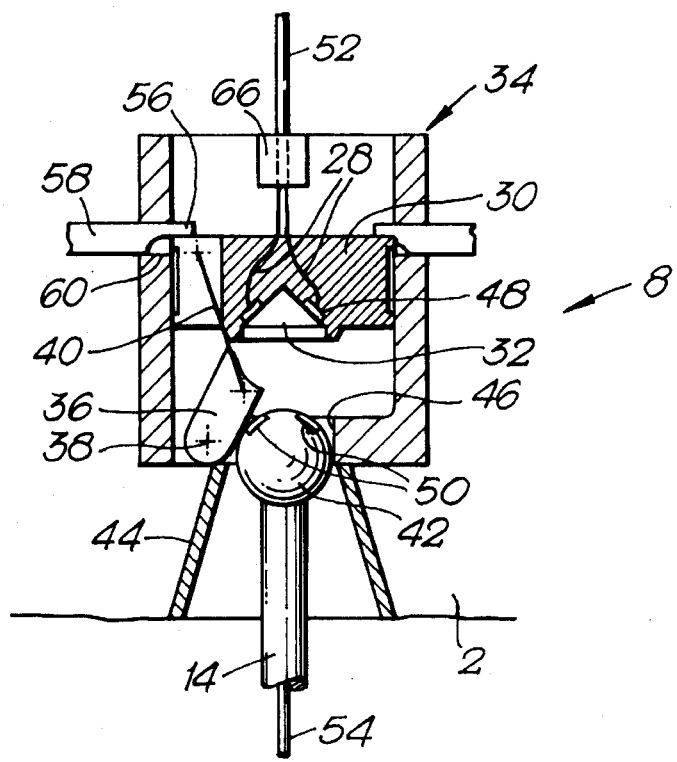

FIG. 2 shows the position of the connecting member 14 during docking of the two aircraft 2 and 4. The spherical head 42 of the probe 14 is guided into position by funnel-shaped receiver 44 which is attached to the base of the casing 11. As the connecting member 14 passes through the entry opening 46 in the casing 34, the jaws 36 are pushed open against the bias of the spring housings 40. Upward movement of the connecting member 14 relative to the casing 34 continues until the head 42 is seated in the centring recess 32. As the head reaches this point the three jaws 36 spring closed, ie pivot back, thus fully encapsulating the lower half of the head of the connecting member 14 (see FIG. 3). This encapsulation is due to the action of the spring housing 40. The carrier aircraft 4 and the conventional aircraft 2 are thus locked together.

Data transmission between the two aircraft is made possible by electrical connecting plates 48 and 50 correspondingly positioned in the centring recess 48 and connecting member head 42. In this way, data can be transmitted from an electrical cable 52 on the conventional aircraft 2 to an electrical cable 54 in the carrier aircraft 4 via connecting wires 46 housed in the piston 30 and the connecting plates 48 and 50.

The piston 30 is prevented from upward movement in the bore of the casing 34 by the reduced-section nose portions 56 of locking members 58 which pass through slots 60 in the casing 34. After the jaws 36 have sprung into their head encapsulating position, the locking members 58 are moved in the direction of arrow 62 to lock the piston 30 solid against the jaws 36, thereby preventing relative movement between the aircraft (see FIG. 4).

After vertical take-off of the aircraft 2 and 4, and when a suitable forward speed has been achieved for the conventional aircraft 2 to fly normally and independently, the aircraft are disconnected by the attachment means 8. To facilitate release, the locking members 58 are withdrawn from the slots 60, as shown in FIG. 5. This action also switches the IFPCS systems of each of the aircraft 2 and 4 into normal flight mode, and the pilot of the carrier aircraft 4 puts his aircraft into a gentle climb, i.e. the two aircraft move relatively towards each other. This causes the connecting member 14 to push the piston 38 upwards relative to the casing 34 in the direction of arrow 64. This has the effect of opening all three jaws 36 via their respective spring housing connections 40 to the piston 30 (see FIG. 5) because the jaws 36 have been moved too far upwardly to be able to spring back beneath the path of downward travel of their head 42. Thus, if the conventional aircraft 2 begins climbing and/or the carrier aircraft 4 begins diving (i.e. the two aircraft move relatively away from each other) the two aircraft may now separate.

In order to eliminate any unexpected upward loads during disconnection of the aircraft, a damper 66 restricts the rate at which the piston 30 may move. The operation of the damper 66 is such that for the pilot to release his/her aircraft, an upward thrust of a predetermined magnitude and/or for a predetermined period, for example 5 seconds, must be maintained.

After disconnection of the two aircraft 2 and 4, the damper 66 causes the piston 34 to slowly move downwardly with respect to the casing, and causes the jaws to take up the position shown in FIG. 2. If the locking members 58 are also repositioned, the conventional aircraft 2 will be ready to connect again to a carrier aircraft 4 to enable it to land vertically at the end of its mission.

It should be understood that in some applications it will be desirable to provide more than one connector between the aircraft because this provides a more secure connection and may also build redundancy into the data transmission between aircraft for improved safety.

I claim:

1. A composite aircraft comprising:

a fixed wing carrier aircraft constructed and arranged to provide in use a first component of lift, another aircraft provided with propulsive force applying means for providing in use a second component of lift substantially equal in magnitude to said first component, a connector comprising a connecting member constructed and arranged to extend from said carrier aircraft to said another aircraft, respective attachment means, at least one of which is releasable, for attaching said carrier aircraft and said another aircraft to said connecting member, and control means for controlling the releasable attachment means such that said carrier aircraft and said another aircraft are connected from takeoff until a predetermined stage of flight during which period they are lifted and sustained in an airborne state as a composite aircraft by a combination of said first and said second components of lift, thereby allowing said another aircraft to takeoff substantially vertically, whereafter said another aircraft and said carrier aircraft are disconnected and are each able to continue flight separately, wherein the connector comprises data transmission means for transmitting data between said carrier aircraft and said another aircraft.

2. An aircraft comprising:

propulsive force applying means for generating a component of lift for said aircraft, a connector for connecting said aircraft to a fixed wing carrier aircraft having a vertical takeoff capability, said connector comprising a connecting member constructed and arranged to extend from said aircraft to said carrier aircraft, respective attachment means, at least one of which is releasable, for attaching said aircraft and said carrier aircraft to said connecting member, and control means for controlling the releasable attachment means such that said carrier aircraft and said aircraft are connected as a composite aircraft from takeoff until a predetermined stage of flight during which period lift for said composite aircraft is provided partly by said propulsive force applying means and partly by said carrier aircraft, thereby allowing said aircraft to takeoff vertically, whereafter said aircraft and said carrier aircraft are disconnected and are each able to continue flight separately, wherein one of said carrier aircraft, said another aircraft and said connector includes aircraft control data modifying means for receiving aircraft control data from said carrier aircraft and said another aircraft and modifying said control data when said carrier aircraft and said another aircraft are attached to one another, the modification being such that said control data is modified in accordance with a control law which enables the controlled flight of said carrier aircraft and said another aircraft when attached to one another as a composite aircraft.

3. An aircraft according to claim 2, wherein said propulsive force applying means is directed generally downwards and rearwardly with respect to the aircraft.

4. An aircraft according to claim 2 or claim 3, wherein said propulsion force applying means is directable, thereby allowing the propulsive force to be applied in a range of directions including generally downwardly to generally rearwardly with respect to the aircraft.

5. A composite aircraft comprising:

a fixed wing carrier aircraft constructed and arranged to provide in use a first component of lift, another aircraft provided with propulsive force applying means for providing in use a second component of lift substantially equal in magnitude to said first component, a connector comprising a connecting member constructed and arranged to extend from said carrier aircraft to said another aircraft, respective attachment means, at least one of which is releasable, for attaching said carrier aircraft and said another aircraft to said connecting member, and control means for controlling the releasable attachment means such that said carrier aircraft and said another aircraft are connected from takeoff until a predetermined stage of flight during which period they are lifted and sustained in an airborne state as a composite aircraft by a combination of said first and said second components of lift, thereby allowing said another aircraft to takeoff substantially vertically, whereafter said another aircraft and said carrier aircraft are disconnected and are each able to continue flight separately, wherein one of said carrier aircraft, said another aircraft and said connector includes aircraft control data modifying means for receiving aircraft control data from said carrier aircraft and said another aircraft and modifying said control data when said carrier aircraft and said another aircraft are attached to one another, the modification being such that said control data is modified in accordance with a control law which enables the controlled flight of said carrier aircraft and said another aircraft when attached to one another as a composite aircraft.

* * * * *